United States Patent
Rehani et al.

(10) Patent No.: US 9,269,353 B1
(45) Date of Patent: Feb. 23, 2016

(54) METHODS AND SYSTEMS FOR MEASURING SEMANTICS IN COMMUNICATIONS

(71) Applicant: DW Associates, LLC, Austin, TX (US)

(72) Inventors: Manu Rehani, Portland, OR (US); Warren L. Wolf, Austin, TX (US)

(73) Assignees: Manu Rehani, Portland, OR (US); Warren L. Wolf, Austin, TX (US)

( * ) Notice: Subject to any disclaimer, the term of this patent is extended or adjusted under 35 U.S.C. 154(b) by 281 days.

(21) Appl. No.: 13/706,093

(22) Filed: Dec. 5, 2012

Related U.S. Application Data

(60) Provisional application No. 61/568,062, filed on Dec. 7, 2011.

(51) Int. Cl.
| | | |
|---|---|---|
| G06F 17/30 | (2006.01) | |
| G10L 15/18 | (2013.01) | |
| G06F 17/27 | (2006.01) | |

(52) U.S. Cl.
CPC ........ *G10L 15/1815* (2013.01); *G06F 17/2785* (2013.01); *G10L 15/1822* (2013.01)

(58) Field of Classification Search
CPC ............ G10L 15/1815; G10L 15/1822; G06F 17/2785
USPC .............................................................. 704/9
See application file for complete search history.

(56) References Cited

U.S. PATENT DOCUMENTS

| | | |
|---|---|---|
| 4,849,898 A * | 7/1989 | Adi |
| 5,128,865 A | 7/1992 | Sadler |
| 5,249,967 A | 10/1993 | O'Leary et al. |
| 5,454,722 A | 10/1995 | Holland et al. |
| 5,533,181 A | 7/1996 | Bergsneider |
| 5,781,879 A | 7/1998 | Arnold et al. |
| 5,797,123 A | 8/1998 | Chou et al. |
| 5,857,855 A | 1/1999 | Katayama |
| 5,887,120 A | 3/1999 | Wical |
| 5,961,333 A | 10/1999 | Harrison et al. |
| 6,126,449 A | 10/2000 | Burns |
| 6,138,085 A | 10/2000 | Richardson et al. |
| 6,173,261 B1 | 1/2001 | Arai et al. |

(Continued)

FOREIGN PATENT DOCUMENTS

| | | |
|---|---|---|
| JP | 2002149675 | 5/2002 |
| JP | 2004102428 | 4/2004 |

(Continued)

OTHER PUBLICATIONS

Samsonovic, et al.,"Principal Semantic Components of Language and the Measurement of Meaning," PLOS, Jun. 11, 2010.*

(Continued)

*Primary Examiner* — Pierre-Louis Desir
*Assistant Examiner* — Forrest F Tzeng
(74) *Attorney, Agent, or Firm* — Marger Johnson

(57) ABSTRACT

A content is divided into tokens. Tokens can represent sounds, symbols, letters, words, sentences, paragraphs, or documents, among other possibilities. Probable measures of meaning (PMMs) are determined for each token. Given a target token, a proximity function for other tokens can be calculated, which in turn can be used to modify the PMMs for the other tokens. These modified PMMs for the other tokens can then be used in conjunction with the PMM for the target token to generate a relative measure of meaning (RMM) for the target token.

15 Claims, 5 Drawing Sheets

(56) References Cited

U.S. PATENT DOCUMENTS

| | | | |
|---|---|---|---|
| 6,256,629 B1* | 7/2001 | Sproat | G06F 17/2715 |
| 6,385,620 B1 | 5/2002 | Kurzius et al. | |
| 6,453,315 B1 | 9/2002 | Weissman et al. | |
| 6,504,990 B1 | 1/2003 | Abecassis | |
| 6,523,026 B1 | 2/2003 | Gillis | |
| 6,556,964 B2 | 4/2003 | Haug et al. | |
| 6,684,202 B1 | 1/2004 | Humphrey et al. | |
| 6,718,325 B1* | 4/2004 | Chandra | |
| 6,816,857 B1* | 11/2004 | Weissman et al. | |
| 7,403,890 B2 | 7/2008 | Roushar | |
| 7,487,094 B1 | 2/2009 | Konig et al. | |
| 7,539,697 B1 | 5/2009 | Akella et al. | |
| 7,555,441 B2 | 6/2009 | Crow et al. | |
| 7,565,403 B2 | 7/2009 | Horvitz et al. | |
| 7,567,895 B2 | 7/2009 | Chen et al. | |
| 7,607,083 B2 | 10/2009 | Gong et al. | |
| 7,644,144 B1 | 1/2010 | Horvitz et al. | |
| 7,702,665 B2* | 4/2010 | Huet et al. | 707/602 |
| 7,711,573 B1 | 5/2010 | Obeid | |
| 7,711,672 B2 | 5/2010 | Au | |
| 7,720,675 B2 | 5/2010 | Burstein et al. | |
| 7,792,685 B2 | 9/2010 | Andino, Jr. et al. | |
| 7,801,840 B2 | 9/2010 | Rapasi et al. | |
| 7,813,917 B2 | 10/2010 | Shuster | |
| 7,870,203 B2 | 1/2011 | Judge et al. | |
| 7,873,595 B2 | 1/2011 | Singh et al. | |
| 7,917,587 B2 | 3/2011 | Zeng et al. | |
| 7,945,497 B2 | 5/2011 | Kenefick et al. | |
| 7,966,265 B2 | 6/2011 | Schalk et al. | |
| 8,090,725 B1 | 1/2012 | Cranfill | |
| 8,229,734 B2* | 7/2012 | Bennett | 704/9 |
| 8,527,262 B2* | 9/2013 | Kambhatla et al. | 704/9 |
| 2002/0026456 A1* | 2/2002 | Bradford | G06F 17/2785 715/210 |
| 2002/0059376 A1 | 5/2002 | Schwartz | |
| 2002/0099730 A1 | 7/2002 | Brown et al. | |
| 2002/0106622 A1 | 8/2002 | Osborne et al. | |
| 2002/0143573 A1 | 10/2002 | Bryce et al. | |
| 2003/0027121 A1 | 2/2003 | Grudnitski et al. | |
| 2003/0028564 A1 | 2/2003 | Sanfilippo | |
| 2003/0093322 A1 | 5/2003 | Sciuk | |
| 2003/0144868 A1 | 7/2003 | MacIntyre et al. | |
| 2003/0167266 A1 | 9/2003 | Saldanha et al. | |
| 2003/0182310 A1 | 9/2003 | Charnock et al. | |
| 2004/0030556 A1 | 2/2004 | Bennett | |
| 2004/0053203 A1 | 3/2004 | Walters et al. | |
| 2004/0117234 A1 | 6/2004 | Lindsay-Scott et al. | |
| 2005/0055209 A1 | 3/2005 | Epstein et al. | |
| 2005/0080613 A1* | 4/2005 | Colledge | G06F 17/2785 704/9 |
| 2005/0165600 A1 | 7/2005 | Kasravi et al. | |
| 2005/0192949 A1 | 9/2005 | Kojima | |
| 2005/0197890 A1 | 9/2005 | Lu et al. | |
| 2005/0202871 A1 | 9/2005 | Lippincott | |
| 2005/0204337 A1 | 9/2005 | Diesel et al. | |
| 2005/0262428 A1 | 11/2005 | Little et al. | |
| 2005/0272517 A1 | 12/2005 | Funk et al. | |
| 2005/0282141 A1 | 12/2005 | Falash et al. | |
| 2006/0047530 A1 | 3/2006 | So et al. | |
| 2006/0206332 A1 | 9/2006 | Paek et al. | |
| 2006/0230102 A1 | 10/2006 | Hidary | |
| 2006/0235843 A1 | 10/2006 | Musgrove et al. | |
| 2006/0246973 A1 | 11/2006 | Thomas et al. | |
| 2006/0271872 A1 | 11/2006 | Shirai | |
| 2007/0061179 A1 | 3/2007 | Henderson et al. | |
| 2007/0112710 A1 | 5/2007 | Drane et al. | |
| 2007/0135225 A1 | 6/2007 | Nieminen et al. | |
| 2007/0136689 A1* | 6/2007 | Richardson-Bunbury | G06F 17/278 715/816 |
| 2007/0196798 A1 | 8/2007 | Pryor et al. | |
| 2007/0203720 A1 | 8/2007 | Singh et al. | |
| 2007/0203991 A1 | 8/2007 | Fisher et al. | |
| 2007/0213126 A1 | 9/2007 | Deutsch et al. | |
| 2007/0214125 A1* | 9/2007 | Williams | 707/3 |
| 2007/0259324 A1 | 11/2007 | Frank | |
| 2007/0260421 A1 | 11/2007 | Berner et al. | |
| 2007/0265089 A1 | 11/2007 | Robarts et al. | |
| 2008/0027891 A1 | 1/2008 | Repasi et al. | |
| 2008/0052283 A1 | 2/2008 | Jensen et al. | |
| 2008/0097781 A1 | 4/2008 | Clarke et al. | |
| 2008/0191864 A1 | 8/2008 | Wolfson | |
| 2008/0208910 A1 | 8/2008 | MacIntyre et al. | |
| 2008/0275744 A1 | 11/2008 | MacIntyre et al. | |
| 2008/0281620 A1 | 11/2008 | Schalk et al. | |
| 2008/0288306 A1 | 11/2008 | MacIntyre et al. | |
| 2008/0288889 A1 | 11/2008 | Hunt et al. | |
| 2008/0300930 A1 | 12/2008 | Compitello et al. | |
| 2008/0319829 A1 | 12/2008 | Hunt et al. | |
| 2009/0006156 A1 | 1/2009 | Hunt et al. | |
| 2009/0006164 A1 | 1/2009 | Kaiser et al. | |
| 2009/0018996 A1 | 1/2009 | Hunt et al. | |
| 2009/0024554 A1 | 1/2009 | Murdock et al. | |
| 2009/0024747 A1 | 1/2009 | Moses et al. | |
| 2009/0035736 A1 | 2/2009 | Wolpert et al. | |
| 2009/0094019 A1* | 4/2009 | Snow | G06F 17/2755 704/9 |
| 2009/0187446 A1 | 7/2009 | Dewar | |
| 2009/0198488 A1 | 8/2009 | Vigen | |
| 2009/0248399 A1 | 10/2009 | Au | |
| 2009/0282104 A1 | 11/2009 | O'Sullivan et al. | |
| 2009/0287672 A1 | 11/2009 | Chakrabarti et al. | |
| 2009/0292541 A1 | 11/2009 | Daya et al. | |
| 2009/0319508 A1 | 12/2009 | Yih et al. | |
| 2009/0327208 A1 | 12/2009 | Bittner et al. | |
| 2010/0023377 A1 | 1/2010 | Sheridan | |
| 2010/0036829 A1* | 2/2010 | Leyba | G06F 17/30684 707/739 |
| 2010/0098289 A1 | 4/2010 | Tognoli et al. | |
| 2010/0100496 A1 | 4/2010 | Baldwin et al. | |
| 2010/0131418 A1 | 5/2010 | McCagg et al. | |
| 2010/0145678 A1 | 6/2010 | Csomai et al. | |
| 2010/0153288 A1 | 6/2010 | Digiambattista et al. | |
| 2010/0174813 A1 | 7/2010 | Hildreth et al. | |
| 2010/0179845 A1 | 7/2010 | Davidson | |
| 2010/0179916 A1 | 7/2010 | Johns et al. | |
| 2010/0228733 A1 | 9/2010 | Harrison et al. | |
| 2010/0274636 A1 | 10/2010 | Sheridan | |
| 2010/0306251 A1 | 12/2010 | Snell | |
| 2011/0040837 A1 | 2/2011 | Eden et al. | |
| 2011/0055098 A1 | 3/2011 | Stewart | |
| 2011/0161073 A1* | 6/2011 | Lesher | G06F 17/2795 704/10 |
| 2011/0184939 A1 | 7/2011 | Elliott | |
| 2011/0208511 A1* | 8/2011 | Sikstrom | G06F 17/2785 704/9 |
| 2011/0258049 A1 | 10/2011 | Ramer et al. | |
| 2011/0295759 A1 | 12/2011 | Selvakummar et al. | |
| 2012/0150533 A1* | 6/2012 | O'Neill | G06F 17/3053 704/9 |
| 2013/0185058 A1 | 7/2013 | Rehani et al. | |

FOREIGN PATENT DOCUMENTS

| | | |
|---|---|---|
| JP | 2004157931 | 6/2004 |
| JP | 2006061632 | 3/2006 |
| JP | 2007249322 | 9/2007 |
| WO | 2004055614 | 7/2004 |
| WO | 2008148819 | 12/2008 |
| WO | 2012000013 | 1/2012 |

OTHER PUBLICATIONS

Lingway Vertical Search Solutions, Lingway HR Suite, "Lingway e-Recruitment Applications: a Semantic Solution for Recruitment", retrieved from http://www.lingway.com/images/pdf/fichelhrslea07anglaisweb.pdf on Jun. 17, 2012 (2 pages).

Hirl, Examiner Joseph P., Office Action dated May 5, 2009, U.S. Appl. No. 11/419,324, filed May 19, 2006 entitled "System and Method for Authoring and Learning".

Van Rijk, R et al., Using CrisisKit and MOPED to Improve Emergency Management Team Training, Proceedings ISCRAM 2004, Brussels, May 3-4, 2004. pp. 161-166.

(56) References Cited

OTHER PUBLICATIONS

Thomas, P.G. et al., AESOP—An Electronic Student Observatory Project, Frontiers in Education, 1998, 5 pages.

Loftin, R.B. et al., Training the Hubble Space Telescope Flight Team, IEEE Computer Graphics and Applications, 1995, pp. 31-37.

Coughlan, Examiner Peter D., Office Action dated Jun. 16, 2008, U.S. Appl. No. 11/419,317, filed May 19, 2006 entitled "Method for Interactive Training and Learning."

Coughlan, Examiner Peter D., Office Action dated Oct. 31, 2008, U.S. Appl. No. 11/419,317, filed May 19, 2006 entitled "Method for Interactive Training and Learning."

Coughlan, Examiner Peter D., Office Action dated Jun. 16, 2009 U.S. Appl. No. 11/419,317, filed May 19, 2006 entitled "Method for Interactive Training and Learning."

Coughlan, Examiner Peter D., Office Action dated Nov. 17, 2009 U.S. Appl. No. 11/419,317, filed May 19, 2006 entitled "Method for Interactive Training and Learning."

Aiolli, Fabio; Sebastiani, Fabrizio; Sperduti, Alessandro, Preference Learning for Category-Ranking Based Interactive Text Cagegorization, Proceedings of International Joint Conference on Neural Networks, ICJNN 2007, Orlando, FL, Aug. 12-17, 2007, pp. 2034-2039.

Mood Indicator Based on History of Electronic Communication Thread, IPCOM, Disclosure No. IPCOM000198194D, Jul. 29, 2010, 3 pages, retrieved from http://ip.com/IPCOM/000198194.

Keh, Huan-Chao, The Chinese Text Categorization System with Category Priorities, Journal of Software, Oct. 2010, vol. 5, No. 10, pp. 1137-1143.

R. Hawkins and M. Russell, Document Categorization Using Lexical Analysis and Fuzzy Sets, IBM Technical Disclosure Bulletin, Jun. 1992, vol. 35, No. 1A, 1 pg.

Tseng, "Semantic Classification of Chinese unknown words", ACL '03 Proceedings of the 41st Annual Meeting on Association for Computational Linguistics—vol. 2 Association for Computational Linguistics Stroudsburg, PA, USA ©2003.

Mohammad, "Measuring Semantic Distance Using Distributional Profiles of Concepts", a thesis submitted in conformity with the requirements for the degree ofGraduate Department of Computer Science University of Toronto, 2008, pp. 1-167.

Mohammad et al., "Measuring Semantic Distance Using Distributional Profiles of Concepts", Association for Computational Linguistics; retrieved at http://www.umiacs.umd.edu/~saif/WebDocs/Measuring-Semantic-Distance.pdf, 2006, pp. 1-34.

Employee Engagement What's Your Engagement Ratio? Gallup Consulting 2008.

Schaufell, Wilmar B. et al. "The Measure of Work Engagement with a Short Questionnaire." A Cross-National Study. Educational and Psychological Measurement. vol. 66, No. 4. Aug. 2006.

Performance Optimization Framework Value Proposition. Introduction and Overview. Knowledge Advisors. Copyright 2009.

Kular, S. et al., Employee Engagement: A Literature Review. Kingston University, Kingston Business School. Working Paper Series No. 19. Oct. 2008.

Richards, David. Hellmann HR Team Instills Values and Behaviors. Strategic HR Review, 2008, 7, 4.

Parks, Louise et al. "A Test of the Importance of Work-Life Balance for Employee Engagement and Intention to Stay in Organisations." Journal of Management and Organization. vol. 14, Issue 3, Jul. 2008.

McBain, R. "The Practice of Engagement." Strategic HR Review. Sep./Oct. 2007; 6; 6.

Hyuna, Choi. "Managing Talent Thourgh Employee Engagement." SERI Quarterly. Jul. 2008.

Moon, K. et al., "Emotional States Recognition of Text Data Using Hidden Markov Models." Proceedings of 2001 Autumn KISS. 2001. vol. 28, No. 2, pp. 127-129.

International Search Report from PCT/US2013/022072, published as WO2013109836 on Jul. 25, 2013, 3 pages.

International Search Report from PCT/US2012/036330, published as WO2012158357 on Nov. 22, 2012, 3 pages.

International Search Report from PCT/US2011/058444, published as WO2012061254 on May 10, 2012, 3 pages.

International Search Report from PCT/US2011/058435, published as WO2012061252 on May 10, 2012, 8 pages.

\* cited by examiner

METHODS AND SYSTEMS FOR MEASURING SEMANTICS IN COMMUNICATIONS

RELATED APPLICATION DATA

This application claims the benefit of U.S. Provisional Patent Application Ser. No. 61/568,062, titled "METHODS AND SYSTEMS FOR MEASURING SEMANTICS IN COMMUNICATIONS", filed Dec. 7, 2011, which is herein incorporated by reference for all purposes.

FIELD

This invention pertains to information, and more particularly to determining the meaning of information.

BACKGROUND

Effective communication among humans is vital for the progress of civilization. Whether written, verbal, prepared, extemporaneous, or in any other form, the meaning, or semantics, of the communication, and how it is expressed, determines the clarity or ambiguity of the communication. Conventionally, communications can be misunderstood for many reasons, including lack of precision in the language, unclear relevance, confusion, and the like.

While current efforts to analyze communications claim to find meaning and assign a value to meaning, they are merely determining "similarity" instead of "meaning" within different contexts, and are therefore incomplete in their analysis. There is a tendency to assume that meaning as an absolute exists in isolation within data or a package of information.

A need remains for a way to address these and other problems associated with the prior art.

DETAILED DESCRIPTION

Figure 1:
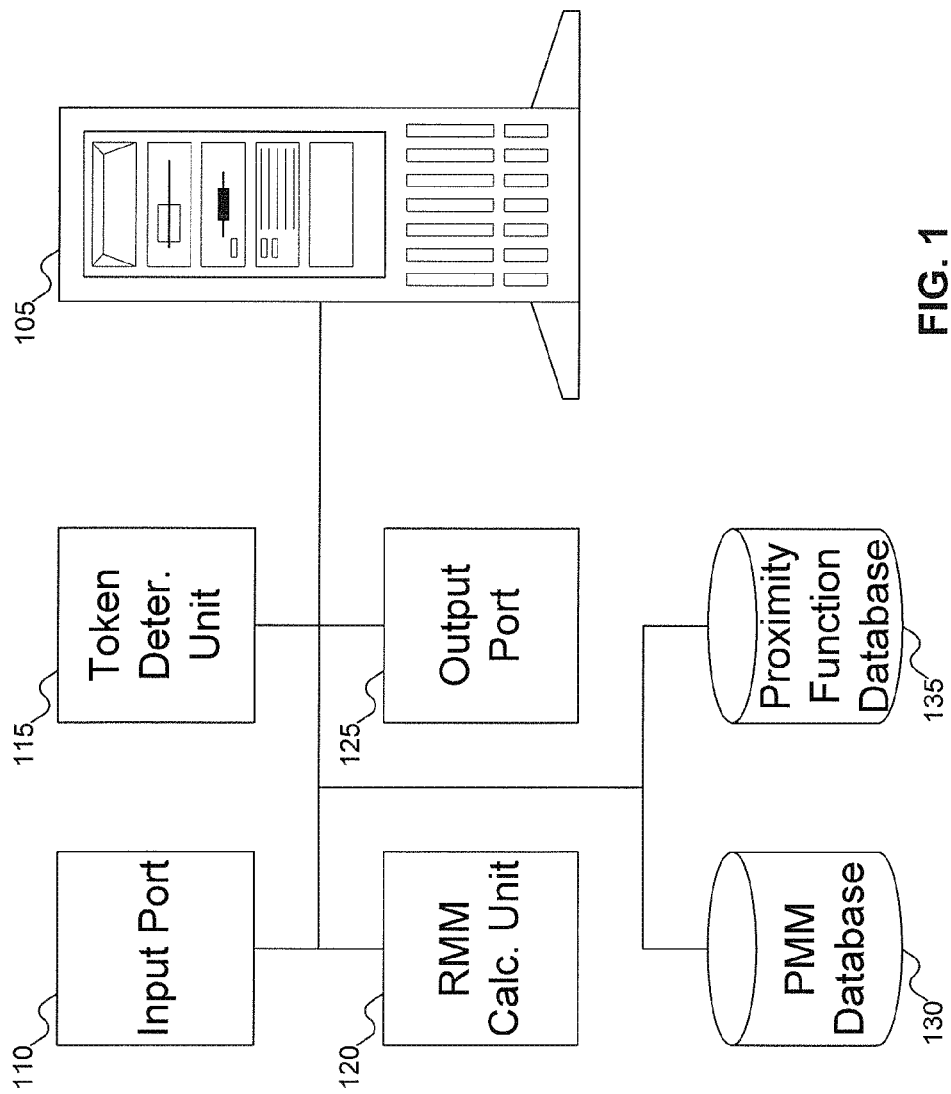
FIG. 1 shows a system that can be used to determine the meaning of information, according to an embodiment of the invention.

As human beings, when we read (or view, or otherwise process) content, we can instinctively determine the semantics of the communication. The communication semantics process (CSP) is a process that enables an observer, reviewer, or participant (e.g., human or computer) in any communication to assign a value to meaning in any part of the communication. The CSP enables relative comparison of meaning between and among different parts of any embodiment of communication, whether it is written, spoken, prepared, extemporaneous, or in any other form.

The data that makes up any particular piece of content can be either structured or unstructured. Structured data—that is, data that takes a recognizable form—can be processed based in part on the structure of the data. In analyzing structured data, data pertaining to certain meaning within a context is stored in pre-determined abstract categories. Then, a schema of translation is applied to convert the abstract categories into categories relevant to a specific context. For example, when a person visits a doctor's office, they are often asked to fill out a form requesting various data: the person's name, age, gender, insurance information, and so on. And as the form is structured the same for each person, a system that processes the forms knows where to look on the form for particular pieces of data, and how to expect that data to be formatted. Continuing the example, the person is expected to put his or her age in a particular location on the form, and to use only numbers in the field. This makes it easier to process the form, as the types of symbols expected in a particular field can be reduced.

Another example of structured data is a database. The data in a database takes a particular form, based on its location, which helps to control its interpretation.

Structured data is typically quantifiable data. But non-quantifiable data can be converted into a quantifiable measure by assigning scores and weights, and then analyzed for relevant meaning.

Unstructured data, in contrast to structured data, can take any form. Examples of unstructured data can be text documents, scripts, and so on. While it is likely that a particular content has a grammar and syntax that applies in interpreting the content, there are no external clues guiding the interpretation of the data, as there usually are in structured data.

Unstructured data is typically non-quantifiable data. Analyzing unstructured data often relies on two main theories:

A) Statistics are used to extrapolate a measure of proximity among words. For example, if a set of words repeatedly appear within a set distance from each other in numerous documents, then it can be said that those documents are about the same topic or context expressed by the words in question.

B) What defines the importance of concepts within a context is what appears less frequently. For example, the outliers define the difference and relative importance of members within a group or among groups.

Communication Semantics is based on the concept that meaning is relative and can be measured in relation to what comes before any data point and what comes after. In addition, the data point in consideration can be as small or as large as needed without any absolute limit. For example, Communication Semantics can be applied to tokens as small a sound, symbol, letter, or word that can be bound and identified within a context, or as large a group of sounds, symbols, letters, or words that can be bound and identified within a context. Thus, the tokens used in Communication Semantics can be as small as individual letters, or as large as sentences, paragraphs, or even entire documents (when comparing multiple documents). The only requirement for Communication Semantics is that there be other tokens before and after the token being analyzed, as needed.

Consider the phrase:

| Base | Today I saw the man with the telescope. |
|---|---|

The base sentence is ambiguous in that its relevance and meaning is not clear, and it is not clear who has the telescope (do "I" have the telescope, or does "the man" have the telescope?).

Now consider the same phrase in one context:

| | |
|---|---|
| Context A | I've been looking to add some telescopes to our inventory. Today I saw the man with the telescope. He seems dependable. |

Given this context, there is higher probability that the "man" had the telescope.

Now consider the same phrase in another context:

| | |
|---|---|
| Context B | I've been looking at the warehouse with my telescope every day to see if the guy returns. Today I saw the man with the telescope. He seemed to be in a rush. |

Given this context, there is higher probability that "I" had the telescope.

Now consider the same phrase in a modification of Context A:

| | |
|---|---|
| Context C | I learned to gauge peoples' dependability by observing how confidant they are when they walk. I've been looking to add some telescopes to our inventory. Today I saw the man with the telescope. He seems dependable. It's fun to watch people through the telescope especially as they approach our office. |

Given this context, there is higher probability that "I" had the telescope. Relatively speaking, Context C implies a higher probability that "I" had the telescope than Context A, but not as high a probability as Context B.

These examples illustrate that it is better to determine the relative measure of meaning of a phrase in relation to what comes before and after the phrase, than in isolation.

More generally, consider a sequence of symbols . . . $\alpha\theta\tau\chi\phi$ . . . Symbolically speaking, the relative measure of meaning of any symbol in a group can be determined in relation to what comes before and after the phrase. As discussed above, these symbols, or tokens, can represent any desired element in the content: a sound, individual symbol, word, sentence, paragraph, or document. In addition, because Communication Semantics can be applied using any desired type of token, Communication Semantics is not limited to content that uses languages that use an alphabet, such as English: it is equally applicable to logographic languages, such as Chinese.

FIG. 1 shows a system that can be used to determine the meaning of information, according to an embodiment of the invention. In FIG. 1, server 105 is shown as including input port 110, token determination unit 115, Relative Measure of Meaning (RMM) calculation unit 120, output port 125, Probable Measure of Meaning (PMM) database 130, and proximity function (PF) database 135. Input port 110 is used to receive content to be analyzed. The content to be analyzed can be, for example, a document, an e-mail, or it can be streamed content (where the tokens in the content are received over time and not all immediately identifiable). Token determination unit 115 can identify tokens in the content. As discussed above, the meaning of the term "token" can be interpreted to represent any desired token, be it a sound, symbol, letter, word, sentence, paragraph, or document, among other possibilities. RMM calculation unit 120 can calculate the relative measure of meaning (RMM) for a token, as will be discussed below. Output port 125 can output information regarding the content, including, for example, the RMM for any number of tokens in the content.

Before explaining how the RMM of a token is calculated, it is important to understand that a given token has a probable measure of meaning (PMM). The PMM for a token represents the different possible meanings a token can have. For example, the word "bad" can have a negative meaning, as in "That was a bad thing to do", or a positive meaning, as in "I really like Tom: he's bad!". For example, the word "bad" can be said to have a negative meaning 90% of the time, and a positive meaning 10% of the time. Without context, it is not possible to know whether a particular use of this word is intended to be positive or negative; thus, the word "bad" only has a PMM.

The PMMs for tokens can be stored in PMM database 130. PMMs for a given token can be stored in advance, or can be generated when needed (for example, by analysis of use of the token in question in various documents. The PMM for a token in PMM database can also be updated as more information is learned about the token: this concept is discussed below.

In addition, the distance between two tokens can affect the meaning of a token. For example, in the sentence "I really like Tom: he's bad!", it is the use of the word "like" that suggests that the word "bad" has a positive meaning. For example, in the sentence "I really hate Tom: he's bad!", the only change is a substitution of "hate" for "like"; but that one change completely alters the significance of the sentence as a whole, and the implied meaning of the word "bad" in particular. But an important consideration is that the words "like" and "bad" are relatively close: they occur in the same sentence, and only 3 words apart. If the words "like" and "bad" happen to occur in a document, but are separated by hundreds of words and pages of content, the likelihood that the word "like" is meant to imply a positive meaning to the word "bad" is greatly reduced.

To represent the fact that the distance between tokens can affect the meaning, proximity function database 135 can be used. Proximity function database 135 can use the token being analyzed, another token in the content, and the relative distance between the two tokens in calculating a factor to be used in weighting the impact of the other token in interpreting the current token. Thus, for example, in determining the impact of the word "like" on the meaning of the word "bad", proximity function database can factor in the words themselves ("like" and "bad") and the distance between these words (3 words apart). The result of this calculation can then be used to adjust the significance of the secondary token towards the relative meaning of the target token. In effect, proximity function database 130 can be used to modify the PMM for a secondary token.

As with PMM database 130, proximity function database 135 can be created in advance and accessed as needed, or the proximity function for a secondary token (given the target token) can be calculated on-the-fly.

Now that PMM database 130 and proximity function database 135 are understood, RMM calculation unit 120 can be further analyzed. RMM calculation unit starts with the PMM for a target token. Then, this PMM is modified using the PMMs and proximity functions for various tokens near the target token. While any formula can be used to calculate the RMM for a target token, one formula that can be used is:

$$RMM(\text{token}_n) = \\ PMM(\text{token}_n) \times \underset{i=-d}{\overset{d}{\text{Mean}}}(PMM(\text{token}_{n-i}) * PF(\text{token}_n, \text{token}_{n-i}, i))$$

That is, the RMM for a token ($token_n$) is the PMM for that token, multiplied by the arithmetic mean (average) of the product of the PMMs of each token and the proximity function (PF) for each token, within a certain distance (d) of the target token. For example, if the chosen distance is 5 tokens, then the PMM and the proximity function of each token that is within 5 tokens (before or after) the target token are determined and multiplied together, then averaged, which is then multiplied by the PMM of the target token to produce the RMM of the target token.

While the above formula is one embodiment that can be used, it should not be considered as providing any limits on how the RMM for a token can be calculated. For example, any distance can be used, up to Go (that is, all tokens in the content can be considered). Or, only tokens on one side of the target token (either before or after) can be considered, with the tokens on the other side ignored. Further, embodiments of the invention are intended to cover all possible formulations to represent the relationship or relationships between RMM, PMM, and the proximity function, using any desired means for calculating RMM, PMM, and the proximity function.

Figure 2:
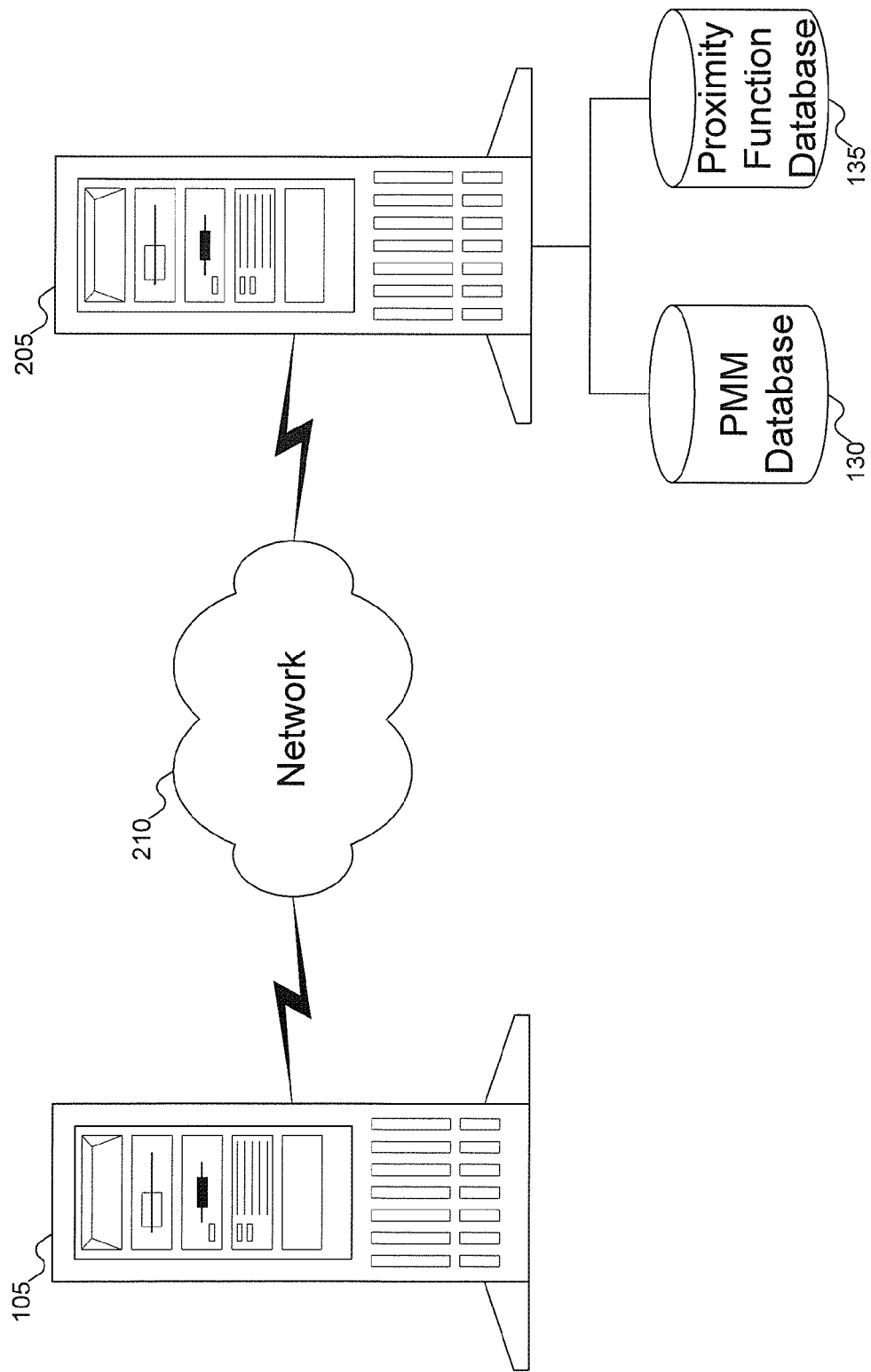
FIG. 2 shows an alternative embodiment to the system of FIG. 1 for use in determining the meaning of information.

While FIG. 1 shows server 105 as including all of the components used to calculate the RMM for a token, a person skill in the art will recognize that other embodiments are possible. For example, FIG. 2 shows an alternative embodiment to the system of FIG. 1 for use in determining the meaning of information. In FIG. 2, server 105 is in communication with server 205 over network 210 (which can be any type of network), which includes PMM database 130 and proximity function database 135. Thus, when server 105 needs information about the PMM of a token or the proximity function for a token, server 105 communicates with server 205 over network 210 to retrieve the desired information. A person of ordinary skill in the art will also recognize that PMM database 130 and proximity function database 135 do not need to reside on the same server: they can reside on different servers, as needed.

Figure 3:
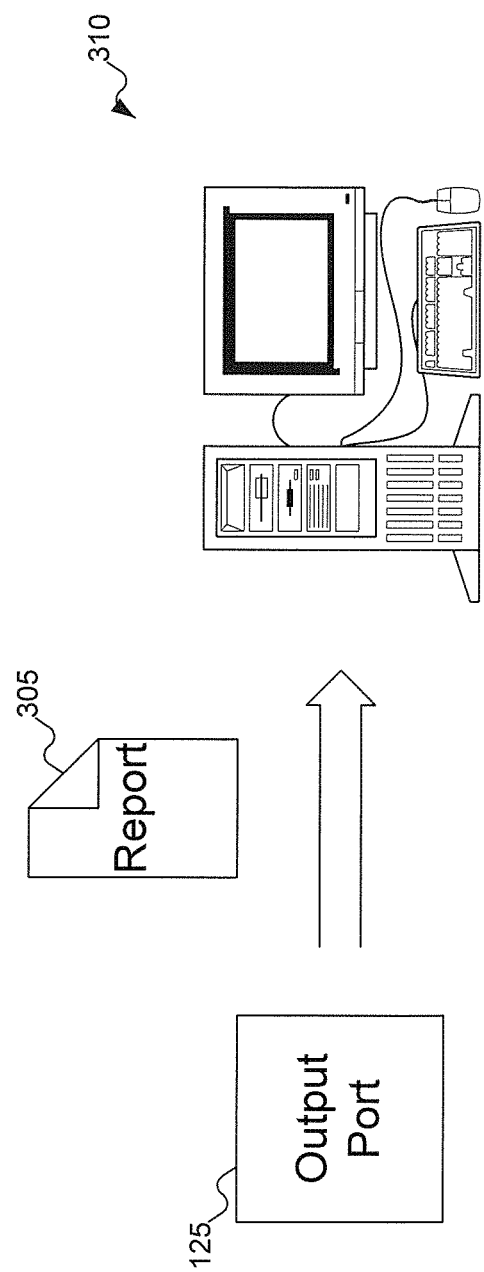
FIG. 3 shows a report being generated and sent to a recipient using the system of FIGS. 1 and 2.

FIG. 3 shows a report being generated and sent to a recipient using the system of FIGS. 1 and 2. In FIG. 3, output port 125 generates report 305, which is sent to client 310. Client 310 can represent one or more data consumers, each of which can include one or more computers or one or more individual persons. The information in report 305 can include one or more statements or reports regarding the analysis described above. Report 305 can correspond to, for example, a physical paper or electronic report.

It will be understood that the report 305 can include an electronic statement or report that is storable in a storage medium such as a hard disk drive, memory, or other suitable storage device. Alternatively, report 305 can include a physical statement or report such as a paper printout, which may be derived from the electronic statement or report.

Figure 4:
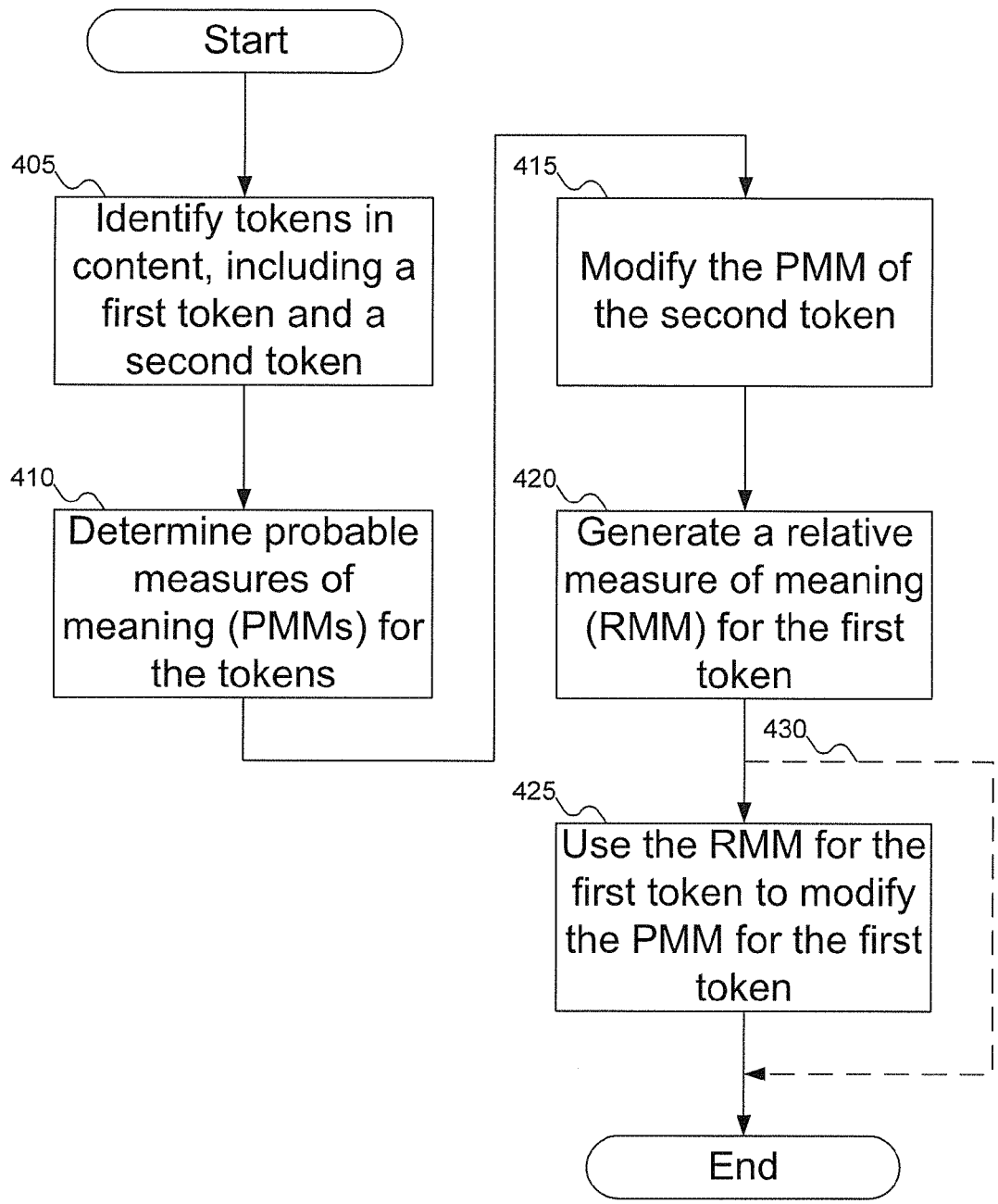
FIG. 4 shows a flowchart of a procedure for determining the meaning of information using the systems of FIGS. 1 and 2, according to an embodiment of the invention.

FIG. 4 shows a flowchart of a procedure for determining the meaning of information using the systems of FIGS. 1 and 2, according to an embodiment of the invention. In FIG. 4, at block 405, the system identifies tokens in content. At block 410, the system determines the probable measures of meaning (PMMs) of the various tokens. At block 415, the system modifies one of the PMMs. As discussed above, this modification can be done using a proximity function relative to another token. At block 420, the system generates a relative measure of meaning (RMM) for a token, using (among other things) the modified PMMs for the other token. This information can then be output as appropriate.

As discussed above, the RMM for a token can in turn be used to modify the PMM for the token. For example, consider again the word "bad", and assume that the PMM for that token only suggested negative meanings for the word. But after analyzing the sentence "I really like Tom: he's bad!", the system has encountered a positive meaning for the word "bad". Accordingly, the PMM for the word "bad" can be updated to reflect the fact that this word can occasionally have a positive meaning.

As shown in FIG. 4, at block 425, the RMM for the token can be used to modify the PMM for that token, for use in later operations. But this modification of the PMM is optional; as shown by dashed line 430, block 425 can be omitted with no loss of functionality.

Figure 5B:
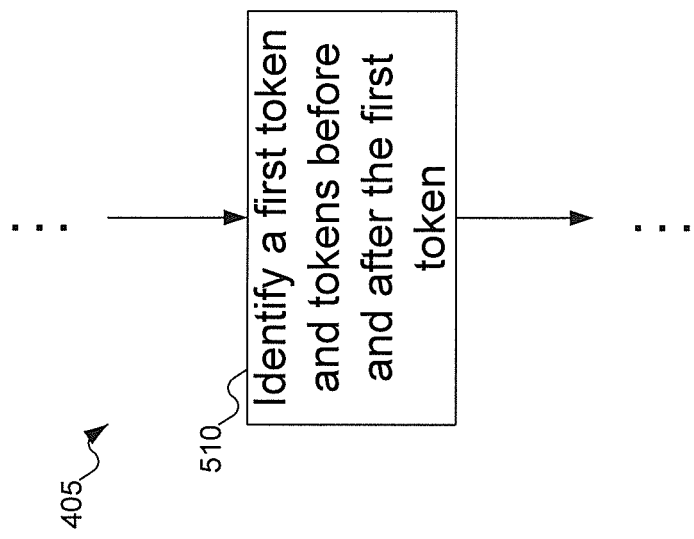
FIGS. 5A and 5B show alternative ways to determine tokens in the flowchart of FIG. 4.
Figure 5A:
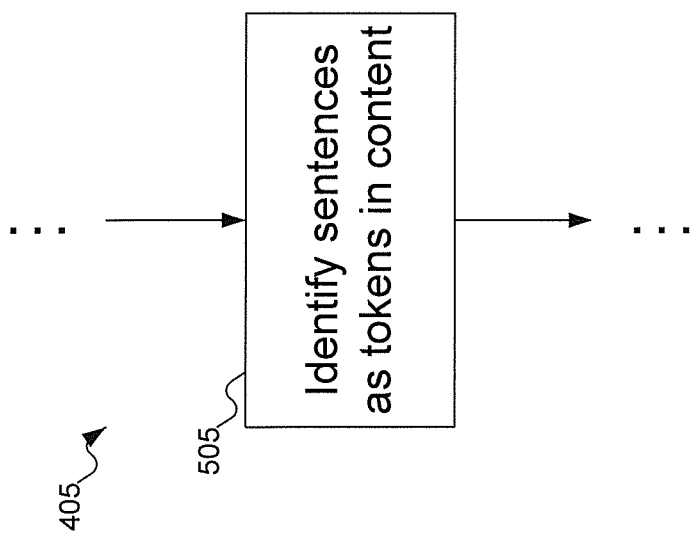

As discussed above, the scope of a "token" can vary. FIGS. 5A and 5B show alternative ways to determine tokens in the flowchart of FIG. 4. In FIG. 5A, at block 505, identifying tokens operates by identifying sentences. In FIG. 5B, at block 510, identifying tokens operates to identify tokens (whatever their scope) both before and after a target token. A person of ordinary skill in the art will recognize other ways in which token identification can be modified. The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other non-transitory storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system, comprising:
a server;
a probable measure of meaning (PMM) database stored on the server, the PMM database storing PMMs for a plurality of tokens;
an input port to receive a content;
a token determination unit on the server operative to determine a token in said content;
a relative measure of meaning (RMM) calculation unit on the server operative to calculate a RMM for said token, factoring in a first probable measure of meaning (PMM) from the PMM database for said token and a plurality of second PMMs from the PMM database for a plurality of second tokens in said content using a proximity function (PF) according to $$RMM(token_n) = \\ PMM(token_n) \times \underset{i=-d}{\overset{d}{Mean}}(PMM(token_{n-i}) * PF(token_n, token_{n-i}, i));$$

and
an output port to output a report including the RMM of said token.

2. A system according to claim 1, wherein the PMM database is stored on a second server, said second server and the server connected via a network.

3. A system according to claim 1, further comprising a proximity function database.

4. A system according to claim 3, wherein the proximity function database is stored on the server.

5. A system according to claim 3, wherein the proximity function database is stored on a second server, said second server and the server connected via a network.

6. A method, comprising:
receiving a content at a server over a network;
identifying a first token in the content using the server;
determining a first probable measure of meaning (PMM) for the first token from a PMM database stored on the server;
identifying at least two second tokens;
determining a second PMM for each of the at least two second tokens from the PMM database stored on the server;
using a proximity function (PF) to modify each of the second PMMs for each of the at least two second tokens, the proximity function factoring in the first token and a distance between the first token and each of the at least two second tokens; and
generating a relative measure of meaning (RMM) for the first token, the RMM factoring in the first PMM for the first token and each of the modified PMMs for each of the at least two second tokens, according to $$RMM(token_n) = \\ PMM(token_n) \times \underset{i=-d}{\overset{d}{Mean}}(PMM(token_{n-i}) * PF(token_n, token_{n-i}, i)).$$

7. A method according to claim 6, wherein:
identifying a first token in the content using the server includes identifying a first sentence in content using the server; and
identifying a second token includes identifying a second sentence.

8. A method according to claim 6, wherein:
identifying at least two second tokens includes identifying a second token preceding the first token and a third token following the first token;
determining a second PMM for each of the at least two second tokens from the PMM database includes determining the second PMM for the second token from the PMM database and determining a third PMM for the third token from the PMM database;
using a proximity function to modify each of the second PMMs for each of the at least two second tokens includes using the proximity function to modify the second PMM for the second token and to modify the third PMM for the third token, the proximity function factoring in the first token and the distance between the first token and the second token and third token; and
generating a RMM for the first token includes generating the RMM for the first token, the RMM factoring in the first PMM for the first token, the modified PMM for the second token, and the modified PMM for the third token.

9. A method according to claim 6, wherein:
identifying at least two second tokens includes identifying five second tokens preceding the first token and five third tokens following the first token;
determining a second PMM for each of the at least two second tokens from the PMM database includes determining a PMM for each of the five second tokens and the five third tokens from the PMM database;
using a proximity function to modify each of the second PMMs for each of the at least two second tokens includes using the proximity function to modify the second PMMs for each of the five second tokens and the five third tokens, the proximity function factoring in the first token and the distance between the first token and each of the five second tokens and the five third tokens; and
generating a RMM for the first token includes generating the RMM for the first token, the RMM factoring in the first PMM for the first token and the modified PMM for each of the five second tokens and the five third tokens.

10. A method according to claim 6, further comprising using the RMM to modify the PMM for the first token in the PMM database.

11. An article, comprising a non-transitory storage medium, said non-transitory storage medium having stored thereon instructions that, when executed by a machine server, result in:
- receiving a content at a server over a network;
- identifying a first token in the content using the server;
- determining a first probable measure of meaning (PMM) for the first token from a PMM database stored on the server;
- identifying at least two second tokens;
- determining a second PMM for each of the at least two second tokens from the PMM database stored on the server;
- using a proximity function (PF) to modify each of the second PMMs for each of the at least two second tokens, the proximity function factoring in the first token and a distance between the first token and each of the at least two second tokens; and
- generating a relative measure of meaning (RMM) for the first token, the RMM factoring in the first PMM for the first token and the each of modified PMMs for each of the at least two second tokens, according to $$RMM(\text{token}_n) = PMM(\text{token}_n) \times \underset{i=-d}{\overset{d}{\text{Mean}}}(PMM(\text{token}_{n-i}) * PF(\text{token}_n, \text{token}_{n-i}, i)).$$

12. An article according to claim 11, wherein:
- identifying a first token in the content using the server includes identifying a first sentence in content using the server; and
- identifying a second token includes identifying a second sentence.

13. An article according to claim 11, wherein:
- identifying at least two second tokens includes identifying a second token preceding the first token and a third token following the first token;
- determining a second PMM for each of the at least two second tokens from the PMM database includes determining the second PMM for the second token from the PMM database and determining a third PMM for the third token from the PMM database;
- using a proximity function to modify each of the second PMMs for each of the at least two second tokens includes using the proximity function to modify the second PMM for the second token and to modify the third PMM for the third token, the proximity function factoring in the first token and the distance between the first token and the second token and third token; and
- generating a RMM for the first token includes generating the RMM for the first token, the RMM factoring in the first PMM for the first token, the modified PMM for the second token, and the modified PMM for the third token.

14. An article according to claim 11, wherein:
- identifying at least two second tokens includes identifying five second tokens preceding the first token and five third tokens following the first token;
- determining a second PMM for each of the at least two second tokens from the PMM database includes determining a PMM for each of the five second tokens and the five third tokens from the PMM database;
- using a proximity function to modify each of the second PMMs for each of the at least two second tokens includes using the proximity function to modify the second PMMs for each of the five second tokens and the five third tokens, the proximity function factoring in the first token and the distance between the first token and each of the five second tokens and the five third tokens; and
- generating a RMM for the first token includes generating the RMM for the first token, the RMM factoring in the first PMM for the first token and the modified PMM for each of the five second tokens and the five third tokens.

15. An article according to claim 11, said non-transitory storage medium having stored thereon further instructions that, when executed by the server, result in using the RMM to modify the PMM for the first token from the PMM database.

* * * * *